United States Patent Office 3,245,865
Patented Apr. 12, 1966

3,245,865
PLASTIC REINFORCED ARTICLES HAVING IMPROVED SURFACE CHARACTERISTICS AND METHOD THEREFOR
Albert W. Hawkins, Princeton, Thomas E. Bugel, Metuchen, and Charles F. Pitt, Basking Ridge, N.J., assignors to Union Carbide Corporation, a corporation of New York
No Drawing. Filed Oct. 18, 1962, Ser. No. 231,580
14 Claims. (Cl. 161—160)

This invention relates to plastic reinforced articles having smooth, pinhole-free surfaces and method therefor. More particularly, the invention relates to plastic reinforced articles comprising a heat hardenable plastic having reinforcing material distributed therein and having on the surface a tough, pinhole-free smooth thermoplastic material. The invention further relates to method of making such articles.

Reinforced plastic articles are one of the plastic industries fastest growing commodities. Such divers items as missile nose cones and boat hulls have been fabricated of reinforced plastics.

In general, the reinforced plastics are a thermosetting material such as an epoxy resin or a polyester resin or a phenolic resin having imbedded therein, generally throughout, a mass of reinforcing material, usually fibrous in nature, and frequently glass fibers. The outstanding advantage of these reinforced plastics is lightness, mechanical inertness and tremendous strength. A problem, however, arises from the fact that known methods of fabricating plastic reinforced articles leave bits of reinforcing material protruding through the surface of the reinforced article.

Various expedients have been attempted in the past to overcome protrusions of reinforcing material. The problem must be overcome if reinforced plastics are to gain wider acceptance, since the protrusions, especially protruding glass fibers act as a wick in drawing moisture into the interior of the plastic article, destroying the fiber reinforcement and causing a deterioration in strength.

Ordinarily a plastic reinforced article is made by arranging on a suitable surface e.g. mold surface, or a flat table or on a mandrel a mass of not fully cured thermosetting resin and the reinforcing material and curing the thermosetting resin.

As will be obvious there is a problem in this technique of adhesion of the thermosetting resin to the work surface. To avoid this a "gel coat" is provided on the work surface. The gel coat is generally a thermosetting resin, for example, an epoxy resin which is formulated and advanced to a stage of cure on the work surface at which the gel coat is sufficiently coherent to prevent protrusion of reinforcing material therethrough and yet not too far advanced to prevent development of adhesion between the gel coat and the reinforced plastic article during cure of the latter.

The criticality of advancing the gel coat to a particular stage of cure necessitates highly skilled labor or involves much waste and is, therefore, expensive. Moreover, gel coats obtained in this fashion frequently have minute pore-like openings as a result of insufficient flow during cure which result in pinholes into the interior of the reinforced plastic article. Surface pinholes are as deleterious as reinforcement protrusions to the reinforced plastic article.

An alternative to the foregoing method is the use of a reinforced gel coat. Typical of reinforced gel coats are epoxy impregnated glass cloths. With this technique also there is the problem of protrusion of glass fibers from the surface which can be overcome only by excessively heavy layers of epoxy resins on the exposed side of the glass mat.

The problems with planar surface plastic reinforced articles also plague presently known methods for fabricating plastic reinforced articles having hollow moisture proofed interiors. This fabrication is accomplished on a mandrel which typically is coated with 8 to 10 coats of a liquid rubber formulation. Each coating, of course, must be individually cured, and the reinforced plastic is superimposed around this interior liner. The liners presently available do not provide sufficient strength of adhesion to the reinforced plastic to retain within themselves materials under pressures which the reinforced plastic could stand. As a result, the leakage develops within these containers well below the bursting limits of the container itself.

It is an object, therefore, of the present invention to provide plastic reinforced articles having surfaces which are smooth, tough, and free of pinholes.

It is another object to provide hollow plastic reinforced articles having a smooth, tough, pinhole-free interior lining.

It is another object to provide method for fabricating such reinforced plastic articles.

It has now been discovered in accordance with the present invention that these and other objects are achieved with a plastic reinforced article comprising a cured thermosetting resin having imbedded therein a reinforcing material and provided with a thermoplastic polyhydroxyether surface. Smooth, tough pinhole-free surfaces on plastic reinforced articles are achieved by arranging a mass comprising a heat hardenable resin and a reinforcing material in a desired configuration against a shaping surface, interposing between the arranged mass and the shaping surface an integral pinhole-free layer comprising solid thermoplastic polyhydroxyether and effecting cure of the heat hardenable resin while the arranged mass is in contact with the thermoplastic polyhydroxyether layer to thereby simultaneously thermoset the mass in the arranged configuration and anchor the thermoplastic polyhydroxyether layer to the surface of the configuration.

Surprisingly, the thermoplastic polyhydroxyether surface layers herein provided adhere tenaciously to the reinforced thermoset resin articles, in contrast to heretofore employed thermoplastic materials such as polyethylene, rubber and the like. The exact nature of the adhesion is not known, but it is believed, although we do not wish to be bound to a particular theory, that the adhesion is attributable to a combination of chemical interreaction and mechanical bonding whereby the thermoplastic polyhydroxyether is intimately connected to the reinforced plastic article at many points on the surface. The term "anchored" is employed herein to describe this phenomenon of chemical and/or mechanical bonding.

Cure of the heat hardenable resins can be effected at room temperatures or elevated temperatures and the term "heat hardenable resins" is intended to include resins hardenable at room temperatures, i.e. 25° C.

The method of the present invention is useful in the fabrication of all pastic reinforced articles comprising a thermosetting resin or heat hardenable resin and a reinforcing material. Among the more important thermosetting materials there can be mentioned epoxy resins, phenolic resins, polyester resins and polyurethane resins. Among the reinforcing materials there can be mentioned glass fibers, e.g. fiber filaments, glass mats, glass cloth and woven roving, metal fibers, such as steel wire, natural and synthetic fibers, such as sisal, burlap, polypropylene, nylon, and polyhydroxyether fibers, and other fillers.

The polyhydroxyethers used as a surface layer on reinforced plastic articles comprising a cured thermosetting resin and reinforcing material and as a gel coat on the work surface in the present method of fabricating pinhole-free surfaced reinforced plastic articles are substantially linear polymers having the general formula

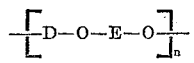

wherein D is the radical residuum of a dihydric phenol, E is an hydroxyl containing radical residiuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The dihydric phenol contributing the phenol radical residuum, D, can be either a dihydric mononuclear phenol such as hydroquinone and resorcinol or a dihydric polynuclear phenol such as those having the general formula

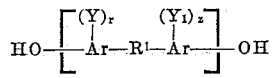

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e. fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —SO$_2$—, and —S—S—, and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Example of specific dihydric polynuclear phenols include, among others:

The bis-(hydroxyphenyl)-alkenes such as
2,2-bis-(4-hydroxyphenyl)propane,
2,4′-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)-pentane,
3,3-bis-(4-hydroxyphenyl)pentane,
2,2-bis-(4-hydroxyphenyl)heptane,
bis-(4-hydroxyphenyl)-phenylmethane,
bis-(4-hydroxyphenyl)cyclohexylmethane,
1,2-bis-(4-hydroxyphenyl)-1,2-bis-(phenyl)propane,
2,2-bis-(4-hydroxyphenyl)-1-phenyl-propane and the like;

Di(hydroxyphenyl)sulfones such as bis-(4-hydroxyphenyl)sulfone, 2,4′-dihydroxydiphenyl sulfone, 5′-chloro-2,4′-dihydroxydiphenyl sulfone, 5′-chloro-4,4′-dihydroxydiphenyl sulfone, and the like;

Di(hydroxyphenyl)ethers such as
bis-(4-hydroxyphenyl)-ether,
the 4,3-′, 4,2′-, 2,2′-, 2,3′-, dihydroxydiphenyl ethers,
4,4′-dihydroxy-2,6-dimethyldiphenyl ether,
bis(4-hydroxy-3-isobutylphenyl)ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4′-dihydroxy-2,6-dimethoxydiphenyl ether,
4,4′-dihydroxy-2,5-diethoxydiphenyl ether, and the like;

Also suitable are the bisphenol reaction products of 4-vinyl-cyclohexene and phenols, e.g. 1,3-bis(p-hydroxyphenyl)-1-ethylcyclohexane, and the bisphenol reaction products of dipentene or its isomers and phenols such as 1,2-bis(p-hydroxyphenyl) - 1 - methyl - 4 - isopropylcyclohexane as well as bisphenols such as 1,3,3-trimethyl-1-(4-hydroxyphenyl)-6-hydroxyindane, and 2,4-bis-(4-hydroxyphenyl)-4-methylpentane, and the like.

Particularly desirable dihydric polynuclear phenols have the formula

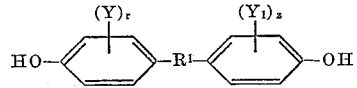

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 9 carbon atoms.

Mixtures of dihydric phenols can also be employed and whenever the term "dihydric phenol" or "dihydric polynuclear phenol" is used herein mixtures of these compounds are intended to be included.

The expoxide contributing the hydroxyl containing radical residuum, E, can be a monoepoxide or diepoxide. By "epoxide" is meant a compound containing an oxirane group i.e. oxygen bonded to two vicinal aliphatic carbon atoms, thus,

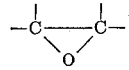

A monoexporide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation i.e. $>C=C<$ and acetylenic unsaturation, i.e. —C≡C—, are preferred. Particularly preferred are halogen substituted saturated monoepoxides i.e. the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2- epoxy-1-methyl-3-chloropropane, 1,2 - epoxy - 1 - butyl-3-chloropropane, 1,2-epoxy - 2 - methyl - 3 - fluoropropane, and the like.

Illustrative diepoxides include diethylene glycol bis(3,4-epoxycyclohexane - carboxylate), bis - (3,4 - epoxycyclohexylmethyl)adipate, bis(3,4 - epoxycyclohexylmethyl) phthalate, 6 - methyl - 3,4 - epoxycyclohexylmethyl - 6-methyl - 3,4 - epoxycyclohexane carboxylate, 2 - chloro-3,4 - epoxycyclohexylmethyl 2 - chloro - 3,4 - epoxycyclohexane - carboxylate, diglycidyl ether, bis(2,3 - epoxycyclopentyl)ether, 1,5 - pentanediol bis(6 - methyl - 3,4-epoxycyclohexylmethyl)ether, bis(2,3 - epoxy - 2 - ethylhexyl)adipate, diglycidyl maleate, diglycidyl phthalate, 3-oxatetracyclo [4·4·0·1$^{7,10}$·0$^{2,4}$] undec -8-yl 2,3 epoxypropyl ether, bis(2,3 epoxycyclopentyl)sulfone, bis(3,4-epoxyhexoxypropyl)sulfone, 2,2' - sulfonyldiethyl bis (2,3 - epoxycyclopentanecarboxylate), 3 - oxatetracyclo [4·4·0·1$^{7,10}$·0$^{2,4}$] undec -8-yl 2,3 epoxybutyrate, 4-pentenaldi(6 - methyl - 3,4 - epoxycyclohexylmethyl)acetal, ethylene glycol bis(9,10-epoxystearate), diglycidyl carbonate, bis(2,3-epoxybutylphenyl)2-ethylhexyl phosphate, diepoxydioxane, butadiene dioxide and 2,3-dimethyl butadiene dioxide. The preferred diepoxides are those wherein each of the oxirane groups is connected to an electron donating substituent which is not immediately connected to the carbon atoms of that oxirane group.

Such diepoxides have the grouping

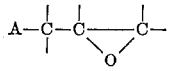

wherein A is an electron donating substituent such as —O—,

—S—, —SO—, —SO$_2$—,

or

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

These thermoplastic polyhydroxyethers can be prepared by admixing in a suitable reaction vessel a dihydric phenol, from about 0.985 to about 1.015 moles of an epoxide, preferably 1.0 mole, per mole of dihydric phenol together with, in the case of using an epihalohydrin, from about 0.5 to about 1.4 moles, preferably about 1.1 to 1.25 moles per mole of dihydric phenol, of an alkali metal hydroxide such as sodium hydroxide, potassium hydroxide, lithium hydroxide and the like, added entirely initially or 5 to 50 percent added stepwise over the course of the reaction, generally in an aqueous medium at a temperature of about 10° C. to about 50° C., preferably about 20 to 40° C. until at least about 60 mole percent of the epihalohydrin has been consumed (conveniently determined by titrating an aliquot part of the mixture with 0.1 N HCl in order to determine the amount of unreacted alkali metal hydroxide, the amount of base consumed corresponding to the amount of unreacted epihalohydrin) adjusting, if necessary, the amount of alkali metal hydroxide in the reaction mixture so that the final concentration of alkali in the aqueous phase of the reacted mixture, i.e., at the completion of the reaction is between about 0.1 molal and 1.2 molal, and preferably from about 0.3 to about 0.6 molal, and heating the reaction mixture at a temperature of from about 60° C. to boiling or reflux or up to 125° C. and higher under pressure until the product thermoplastic polyhydroxyether has the desired reduced viscosity, generally about 0.35 and preferably above 0.5.

Once a polyhydroxyether is produced which has the desired reduced viscosity of, usually at least about 0.35 to about 1.2 or more (measured at 25° C. as a 0.2 gram sample in 100 milliliters of tetrahydrofuran) it is customary to insure that the polyhydroxyether is free of epoxy groups, i.e.,

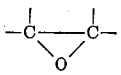

by adding to an organic solution of the polyhdroxyether, a small amount of a monofunctional compound which will destroy epoxy groups and heating the mixture for about 0.5 to 2 hours at reflux temperature. Illustrative of such compounds are such monohydric phenols as p-hydroxybiphenyl, o - hydroxybiphenyl, o - cyclohexylphenol, p-cyclohexylphenol and the like; mineral acids such as hydrochloric acid, phosphoric acid and the like, monocarboxylic acids such as those having the formula R$^4$COOH wherein R$^4$ is a saturated hydrocarbon group, preferably containing from 1 to 4 carbon atoms, such as acetic acid, propionic acid, butyric acid and the like; aromatic acids such as benzoic acid and the like; secondary amines such as dimethylamine, diethylamine, di-n-propylamine, diethanolamine, and the like; mercaptans such as those having the general formula R$^5$OH wherein R$^5$ is a saturated hydrocarbon group, preferably containing 1 to 4 carbon atoms inclusive, such as ethyl mercaptan and the like.

As a rule, heating an organic solution of the polyhydroxyether in contact with from about 0.1 mole to about 0.5 mole of a monofunctional compound, per mole of dihydric polynuclear phenol forming part of the initial reaction mixture, is sufficient to insure that all epoxy groups have been destroyed. More than about 0.5 mole of the monofunctional compound per mole of the dihydric polynuclear phenol can be used if so desired. The polymer solution is acidified by the addition of small amounts of acid dissolved in water. Suitable acids include mineral acids, e.g., hydrochloric and phosphoric, and organic acids, e.g., acetic and oxalic. The acid wash serves to convert any alkali metal hydroxide which is still entrained in the polymer solution to the corresponding salt, which is readily removable by a water wash. The polymer solution is acid water washed until the solution has a pH of less than about 4.5. The thermoplastic polyhydroxyether is recovered by stripping off the solvent, as for example, by the use of a heated, two-roll mill or by coagulating the polyhydroxyether in a nonsolvent such as isopropanol or a mixture of isopropanol and water and recovering the polyhydroxyether as a filter cake, generally a white powdery solid.

The reaction is conducted, generally, under atmospheric pressure although, if desired, the reaction can be conducted under sub-atmospheric or in certain instances, preferably under super-atmospheric pressure. Also, the reaction can be conducted under the atmosphere of an inert gas such as nitrogen.

The preparation of thermoplastic polyhydroxyether is illustrated by the following reaction description. Parts and percentages are by weight. Melt flow herein was determined at 220° C. and 44 pounds/square inch pressure according to ASTM 1238–57T.

The equipment used was a 350 gallon stainless steel autoclave having a bottom outlet and provided with an agitator, reflux condenser, and a temperature sensing device. There was placed in the autoclave:

| | Lbs. |
|---|---|
| 2,2-bis(4-hydroxyphenyl)propane | 400 |
| Ethanol | 370 |
| Aqueous sodium hydroxide (24.1%) | 320 |
| Epichlorohydrin | 163.95 |

The reaction mixture was held for 16 hours at 29–32° C. and then heated to reflux (80° C.) over the course of one hour. After one hour of holding at 80° C. there was added 80 lbs. of a 6:4 toluene:n-butanol mixture over the course of one hour. The total reaction time at 80° C. was two and one-half hours. The polymerization was then terminated with 12 pounds of phenol dissolved in 120 pounds of the 6:4 toluene:n-butanol mixture. After holding an additional two hours at 80° C., the reaction mass was cooled to 60° C. and there was added with agitation 350 pounds of water and 1427 pounds of the 6:4 toluene:n-butanol solvent mixture. After cooling to 30° C., the reaction mixture/solvent mass was permitted to settle. The lower aqueous layer which developed was drained off. The upper organic layer was washed with water containing 4 percent n-butonal. The weight ratio of water to the organic layer was 1:5. After separation of the water layer, the organic layer was acidified with 6 pounds of 85 percent phosphoric acid dissolved in the 350 pounds of water containing 4 percent n-butanol. The polymer-solvent layer was then further washed four times with water in the same ratio as above (1:5). The polymer was isolated by stripping off volatiles in a heated twin screw mill.

The thermoplastic polyhydroxyethers used in this invention can be further modified by being reacted with a variety of cross-linking agents such as, among others, organic isocyanates, e.g. toluene diisocyanate, dianisidine diisocyanate, polyethylene polyisocyanate, toluene diisocyanate, terminated polybutylene glycol, and phenol blocked polyisocyanate and the like; methylol containing compounds, e.g. 2,4,6-trimethylolphenol, polymethylolated bisphenol sulfone, dimethylol-p-tert-butylphenol, dimethylol - p - methylphenol, butylphenol-formaldehyde resin, nonylphenol-formaldehyde resin, butylated melamine-formaldehyde resin and the like; epoxy compounds, e.g. the diglycidyl ether of 2,2-bis(4-hydroxyphenyl)propane, 2,4-epoxy - 6-methylcyclohexymethyl-3,4-epoxy-6-methylcyclohexanecarboxylate and the like; aldehydes, e.g. glyoxal, dialdehyde starch, formaldehyde polymers and the like; formals, e.g. dibutyl formal, di-(2-chloromethyl) formal and the like; carboxylic acid anhydrides, e.g. maleic anhydride, phthalic anhydride and the like; organic and inorganic acids, e.g. glutaric acid, sebacic acid, isophthalic acid, phosphoric acid; chloroformates, e.g. diglycol chloroformate of 2,2-bis(4-hydroxyphenyl)propane and the like; silanes, e.g. ethyltrichlorosilane, diphenyl dichlorosilane, tetraethyl ortho silicate and the like; metal organic salts, e.g. tetrabutyl titanate, aluminum acetyl acetonate, zinc acetyl acetonate, zirconium acetyl acetonate and the like; ureas, e.g. dimethyl ether of dimethylol urea; inorganic esters, e.g. dimethyl sulfate; acyl chlorides, e.g. succinyl chloride and the like; inorganic polychlorides, e.g. zinc chloride, aluminum trichloride and the like; esters, e.g. glycol diformate, glycol dipropionate triglycol di-(2-ethylhexanoate) and the like; as well as trichloroacetaldehyde glyoxalic acid, and epichlorohydrin and similar compounds having mixed functional groups.

The thermoplastic polyhydroxyethers are cross linkable with the above and similar polyfunctional reagents by any of a variety of means providing intimate contact of the crosslinking agent and the thermoplastic polyhydroxyether, for example the thermoplastic polyhydroxyether and crosslinking agent can be codissolved in a mutual solvent or melted together on a two-roll mill, or fluxed together in a compounding extruder or similar apparatus such as a Banbury mixer.

A gel coat of thermoplastic polyhydroxyether layer can be achieved on the work surface in a variety of ways. For example, the polyhydroxyether can be dissolved in some appropriate solvent such as methyl ethyl ketone, dimethyl formamide, tetrahydrofuran, trimethyl sulfoxide, and the like, and applied e.g. as a 5% to 80% solution to the work surface. The solvent is driven off and the plastic reinforced article is constructed against this layer. Alternatively and advantageously with thermoplastic polyhydroxyether, a film or a sheet of thermoplastic polyhydroxyether ranging from for example 0.5 mil to 100 mils in thickness can be placed against the work surface and the plastic reinforced article constructed thereagainst. It is an attractive feature of thermoplastic polyhydroxyether that it can be fabricated into any contour, however complicated, desired by vacuum forming for example. The use of thermoplastic polyhydroxyether as a thin, flexible film permits rapid lining of complicated mold interiors. The use of relatively stiff polyhydroxyether sheets permits the pre-forming of custom contoured layers which will nest within a mold. In some instances where remote crevices are encountered, polyhydroxyether can be solution coated onto the mold surface or introduced into the mold as a hot melt. The polyhydroxyether gel coat and surface layer can contain the usual additives for thermoplastics including, colorants, fillers, extenders, flame retardant mixtures, and the like and can contain as well, particular materials which impart specific desired properties such as ground phenolic resin to enhance ablation properties or asbestos to raise the apparent heat distortion temperature.

Thermoplastic polyhydroxyether can be reinforced as by glass cloth, to which it readily laminates, from the melt, a solution, or as a film and used reinforced as a gel coat and reinforced plastic article surfacing layer.

The following examples are presented to illustrate the invention. All parts and percentages are by weight unless otherwise stated.

*Example 1*

A 5 mil extruded film of a composition containing 100 parts by weight of thermoplastic polyhydroxyether (melt flow 7.0) and 3 parts of light red oxide of iron was laid on a laminating table as a work surface. On this thermoplastic polyhydroxyether gel coat there was laid-up glass cloth and an epoxy resin formulation comprising:

| | Parts by weight |
|---|---|
| Diglycidyl ether of 2,2-bis(4-hydroxyphenyl) propane | 69.5 |
| Butyl glycidyl ether | 10.5 |
| n-Hydroxyethyl diethylenetriamine | 15.5 |
| 2,2-bis(4-hydroxyphenyl) propane | 4.5 |

The glass cloth was #54 (Ferro) woven roving, 18 ounces per square yard, Volan-A finish. Cure of the lay up was at room temperature. The dimensions of the reinforced plastic article, a laminate, were 6" by 12" by 0.040 inch. The thermoplastic polyhydroxyether layer could not be delaminated from the reinforced plastic article without destroying the film. The polyhydroxyether covered surface of the article was smooth and pinhole-free.

*Example 2*

Example 1 was duplicated but employing a battery of heat lamps to accelerate cure. Surface temperature of the reinforced plastic article during cure was about 270° F. A smooth, pinhole-free surfaced article was obtained.

*Example 3*

Example 1 was duplicated but substituting for the woven roving woven strands. A smooth pinhole-free surface was obtained.

*Example 4*

Example 1 was duplicated. The resulting smooth surfaced reinforced plastic article was tested for impact strength by dropping an 8 pound steel ball onto the thermoplastic polyhydroxyether layer covered surface. At a drop of 36" concentric cracks radiated from the point of impact, but the structure did not fail.

*Example 5*

A reinforced layer of thermoplastic polyhydroxyether was used as the gel coat.

A film 8 mils thick of thermoplastic polyhydroxyether (melt flow 2.0) was laminated to one ply of woven glass cloth P–900 (Ferro) square weave, 9 ounces per square yard, chrome complex finish by pressing the film and the glass cloth together under a pressure of 143 pounds/ square inch at 300° F. for 5 minutes. The resulting laminate measured 8" x 8" x 0.020", was free of pinholes and perfectly smooth on the film side.

This laminate was laid on a table, smooth side down and a hand lay up of glass cloth and epoxy resin was made as in Example 1. There was obtained a well-integrated laminate 8" x 8" x 0.50". The thermoplastic polyhydroxyether film layer could not be delaminated.

*Example 6*

A section of the 5 mil film of Example 1 was used as a gel coat in laying up a glass cloth reinforced polyester resin. The glass cloth reinforcement was layers of P–900 and #54 (Ferro) glass cloth. The polyester resin formulation was:

| | Parts |
|---|---|
| Polyester of maleic anhydride, phthalic anhydride and a mixture of propylene glycol, dipropylene glycol and ethylene glycol and styrene (30–40% by weight) | 75 |
| Polyester of maleic anhydride, adipic anhydride, and phthalic anhydride, diethylene glycol, and dipropylene glycol and styrene (20–35% by weight) | 25 |
| Methyl ethyl ketone peroxide in dimethyl phthalate (60%) | 1 |
| Cobalt naphthenate solution (6%) | 0.1 |

Lay-up was carried out as in Example 1. Cure was at room temperature overnight, followed by a post cure of 2 hours at 60° C. Adhesion between the reinforced plastic article and the thermoplastic polyhydroxyether film was excellent as evidenced by delamination without damage being impossible. The article surface was smooth and completely pinhole-free.

*Example 7*

Example 6 is duplicated substituting for the polyester resin a thermosetting phenolic resin. Results are identical.

*Example 8*

Using the lay-up method of Example 5 a female mold is lined with film of thermoplastic polyhydroxyether and the laminate laid thereon. A contoured plastic reinforced article having a smooth pinhole-free surface is obtained.

*Example 9*

Example 5 is duplicated substituting for the glass cloth short metal fibers. Similar results are obtained.

As indicated generally above hollow reinforced plastic articles e.g. cylinders, cones and similar structures of light weight and great strength are produced by winding under tension glass roving which has been dipped into a heat hardenable resin about a mandrel or form. The thus arranged mass of fibers and resin is cured either at room temperature or with additional heat. The product is a rounded shape e.g. a bottle, tube, cylinder, tank or the like. The finished structure comprises 70–90 percent by weight glass, the balance being resin. Strength characteristics and orientations are designed into the pieces by the geometry of the wind.

Practical application of these structures has been hampered by a porosity to gases and liquids because of the low resin content and, therefore, linings or "bladders" are employed in tank like structures. The best bladders thus far developed are none too good because they comprise rubber which generally must be fabricated right on the mandrel by a costly coat and cure cycle to the desired thickness, e.g. 40 mils where internal pressures of 1000 p.s.i. and up are to be encountered. The rubber has no inherent tendency to adhere to the resin matrix of the glass fiber and laminations are therefore poor, and fail in cycling tests. Other thermoplastic materials, e.g. polyethylene either suffer the same lack of adhesion or embrittle with age or lose components e.g. plasticized polyvinyl chloride resins.

All the disadvantages associated with liners for filament wound structures heretofore known are obviated by the use of thermoplastic polyhydroxyether. This resin unique among thermoplastics bonds like a heat hardenable resin, and has as well, adequate elongation characteristics, good heat stability and outstanding gas impermeability properties. Wall thickness is easily controlled by the use of films of the desired gauge or a plurality of thinner gauge films. Solution and hot melt coating of the mandrel is also possible. A mandrel composed entirely of hollow polyhydroxyether can be used either as a thin wall structure inflated with a fluid such as air, or a heavy wall structure which is self-supporting.

*Example 10*

Four ring mold mandrels designed to make rings having 5.75" inside diameter, 6.0" outside diameter and 0.25" width were used. Two mold mandrels were dipped in a silicone mold release, dried and lined with film of thermoplastic polyhydroxyether 0.25" wide and 5.75" long i.e. just large enough to exactly cover the interior of the ring mold mandrel. These lined mold mandrels and two other, unlined mold mandrels were each individually wrapped with glass filaments (Owens-Corning 12 end, style 801) which had been dipped in a heat hardenable resin comprising:

| | Parts |
|---|---|
| Diglycidyl ether of 2,2-bis(4-hydroxyphenyl)propane | 66.05 |
| Meta-phenylenediamine | 15.40 |
| Methylene dianiline | 8.25 |
| Bis-(2,3-epoxycyclopentyl)ether | 37.50 |

After winding, the rings were cured in the mold mandrels for 2 hours at 85° C. and 4 hours at 150° C. The molds were removed and the rings inspected.

The two rings made in the thermoplastic polyhydroxy ether ring mold were smooth and free of pinholes and voids on the inner skin. The other two rings had coarse surfaces and glass filaments could be felt by running a finger along the ring interior. There were absolutely no protrusions from the polyhydroxyether lined rings. The line of demarcation between the lining and the ring was not detectable with the naked eye, so perfect was the fusion of the thermoplastic with the heat hardened binder. A rubber liner for filament wound rings is easily separated from the ring because the rubber has no adhesion to the resin/glass mixture.

*Example 11*

Thermoplastic polyhydroxyether 60 mils thick was vacuum formed over a steel cylindrical mandrel having ovaloid end domes 18" in length and 6" in diameter. The coated mandrel was then placed in a filament winding machine and wrapped with the glass filaments and epoxy resin system of Example 10 to a wall thickness of approximately 0.060" with a combination of 25° and 90° winding (with the longitudinal axis of the cylinder). Cure was effected as in Example 10. The case was pressurized hydraulically to 750 pounds/square inch at which pressure failure occurred.

In a Control a case was identically fabricated but without the thermoplastic polyhydroxyether liner. The case leaked badly at only 400 pounds/square inch pressure. The interior of the case was rough and had glass protrusions.

The polyhydroxyether faced reinforced plastics described herein are of especial utility in forming braced structures such as truck bodies and boat hulls because the bracing, generally a metal rib or the like can be securely bonded by simply heating the interface between the polyhydroxyether and the bracing or solvent sealing or otherwise bonding.

*Example 12*

A polyhydroxyether was prepared as follows:

A vessel was charged wtih 22.6 parts of 2,2-bis(4-hydroxyphenyl)propane, 40.0 parts of ethanol, 6.5 parts of water, and 0.76 parts of the disodium salt of bisphenol-A (as hexahydrate). To the stirred mixture, 8.83 parts of mesobutadiene dioxide was added and heat applied to permit reflux (80. C.). After 2½ hours at reflux, 30 parts of dimethoxyethane and 30 parts of dimethylsulfoxide were added to dissolve the precipitated polymer. Reflux was continued for an additional 24 hours. The solution was cooled, the polymer coagulated in isopropanol, and vacuum dried to yield a white powder. The polymer had a reduced viscosity of 0.25 in dimethylformamide and formed clear, water-white films when compressed at 140° C. An epoxy assay of the powder gave a value of greater than 10,000 g. of polymer per epoxy unit which is indicative of very little residual epoxy. A phenolic determination indicated that two phenolic hydroxyls were present for every 40 polymer units of the following type:

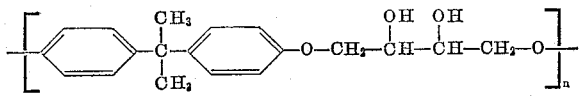

Example 6 is duplicated using a 5 mil film of the above polyhydroxyether as the gel coat.

What is claimed is:

1. Reinforced plastic article consisting essentially of a thermoset resin and a reinforcing material in a desired configuration and anchored thereto a smooth, tough, pinhole-free surface layer of a thermoplastic polyhydroxy ether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

2. Reinforced plastic article consisting essentially of a thermoset resin and fiber reinforcing material in a desired configuration and anchored thereto a smooth, tough, pinhole-free surface layer of a thermoplastic polyhydroxy ether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

3. Reinforced plastic article consisting essentially of a thermoset resin and glass fiber material in a desired configuration and anchored thereto a smooth, tough, pinhole-free surface layer of a thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

4. Reinforced plastic article consisting essentially of a thermoset epoxy resin and glass fiber material in a desired configuration and anchored thereto a smooth, tough, pinhole-free surface layer of a thermoplastic polyhydroxy ether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of a least about 0.5.

5. Reinforced plastic article consisting essentially of a thermoset phenolic resin and glass fiber material in a desired configuration and anchored thereto a smooth, tough, pinhole-free surface layer of a thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

6. Reinforced plastic article consisting essentially of a thermoset polyester resin and glass fiber material in a desired configuration and anchored thereto a smooth, tough, pinhole-free surface layer of a thermoplastic polyhydroxy ether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

7. Reinforced plastic article consisting essentially of a thermoset polyurethane resin and glass fiber material in a desired configuration and anchored thereto a smooth, tough, pinhole-free surface layer of a thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5.

8. Method for fabricating reinforced plastic articles having an inseparable, smooth, pinhole-free surface comprising:
(a) placing against a shaping surface an integral, pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;
(b) arranging a mass of thermosetting resin and reinforcing material in a desired configuration against the solid thermoplastic polyhydroxyether layer covered shaping surface;
(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and
(d) removing from the shaping surface the resulting pinhole-free surfaced, shaped reinforced plastic article.

9. Method for fabricating reinforced plastic articles having an inseparable, smooth, pinhole-free surface comprising:
(a) placing against a shaping surface an integral pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;
(b) arranging a mass of thermosetting resin and fiber reinforcing material in a desired configuration against the solid thermoplastic polyhydroxyether layer covered shaping surface;

(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and (d) removing from the shaping surface the resulting pinhole-free surface, shaped reinforced plastic article.

10. Method for fabricating reinforced plastic articles having an inseparable, smooth, pinhole-free surface comprising:

(a) placing against a shaping surface an integral pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;

(b) arranging a mass of thermosetting resin and glass fiber reinforcing material in a desired configuration against the solid thermoplastic polyhydroxyether layer covered shaping surface;

(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and (d) removing from the shaping surface the resulting pinhole-free surfaced, shaped reinforced plastic article.

11. Method for fabricating reinforced plastic articles having an inseparable, smooth, pinhole-free surface comprising:

(a) placing against a shaping surface an integral pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;

(b) arranging a mass of thermosetting epoxy resin and glass fiber reinforcing material in a desired configuration against the solid thermoplastic polyhydroxyether layer covered shaping surface;

(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and (d) removing from the shaping surface the resulting pinhole-free surfaced, shaped reinforced plastic article.

12. Method for fabricating reinforced plastic articles having an inseparable, smooth, pinhole-free surface comprising:

(a) placing against a shaping surface an integral, pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;

(b) arranging a mass of thermosetting phenolic resin and glass fiber reinforcing material in a desired configuration against the solid thermoplastic polyhydroxyether layer covered shaping surface;

(c) effecting cure of said thermosetting resin while the arranged mass is in contact with the thermoplastic polyhdroxyether layer to thereby simultaneously thermoset the mass in the arranged configuration and anchor the thermoplastic polyhydroxyether layer to a surface of the configuration; and (d) removing from the shaping surface the resulting pinhole-free surfaced, shaped reinforced plastic article.

13. Method for fabricating reinforced plastic articles having an inseparable, smooth, pinhole-free surface comprising:

(a) placing against a shaping surface an integral, pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;

(b) arranging a mass of thermosetting polyester resin and glass fiber reinforcing material in a desired configuration against the solid thermoplastic polyhydroxyether layer covered shaping surface;

(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and (d) removing from the shaping surface the resulting pinhole-free surfaced, shaped reinforced plastic article.

14. Method for fabricating reinforced plastic articles having an inseparable, smooth, pinhole-free surface comprising:

(a) placing against a shaping surface an integral, pinhole-free layer consisting essentially of a solid thermoplastic polyhydroxyether reaction product of about 0.985 to about 1.015 moles of an epoxide, per mole of dihydric phenol, characterized by having essentially no 1,2-epoxy groups, a degree of polymerization of at least 30, and a reduced viscosity measured at 25° C. as a 0.2 gram sample in 100 milliliters of tetrahydrofuran of at least about 0.5;

(b) arranging a mass of thermosetting polyurethane resin and glass fiber reinforcing material in a desired configuration against the solid thermoplastic polyhydroxyether layer covered shaping surface;

(c) effecting cure of said thermosetting resin while the arranged mass is in contact with the thermoplastic polyhydroxyether layer to thereby simultaneously thermoset the mass in the arranged configuration and anchor the thermoplastic polyhydroxyether layer to a surface of the configuration; and (d) removing from the shaping surface the resulting pinhole-free surfaced, shaped reinforced plastic article.

References Cited by the Examiner

UNITED STATES PATENTS

| | | | |
|---|---|---|---|
| 2,592,560 | 4/1952 | Greenlee | 260—47 |
| 2,801,989 | 8/1957 | Farnham | 161—185 |
| 2,806,016 | 9/1957 | Schwarzer | 161—185 |
| 2,830,721 | 4/1958 | Pinsky et al. | |
| 2,875,117 | 2/1959 | Potchen et al. | 161—184 |

FOREIGN PATENTS 764,330   12/1956   Great Britain.

ALEXANDER WYMAN, *Primary Examiner.*

EARL M. BERGERT, *Examiner.*